United States Patent
Manfe et al.

(10) Patent No.: US 9,698,659 B2
(45) Date of Patent: Jul. 4, 2017

(54) FLUX-SWITCHING ELECTRICAL MACHINE

(71) Applicant: MOTEURS LEROY-SOMER, Angouleme (FR)

(72) Inventors: Philippe Manfe, Linars (FR); Patrick Vohlgemuth, La Rochefoucauld (FR); Benjamin Gaussens, La Masquere (FR)

(73) Assignee: MOTEURS LEROY-SOMER, Angouleme (FR)

( * ) Notice: Subject to any disclaimer, the term of this patent is extended or adjusted under 35 U.S.C. 154(b) by 573 days.

(21) Appl. No.: 14/350,474

(22) PCT Filed: Nov. 8, 2012

(86) PCT No.: PCT/IB2012/056253
§ 371 (c)(1),
(2) Date: Apr. 8, 2014

(87) PCT Pub. No.: WO2013/068956
PCT Pub. Date: May 16, 2013

(65) Prior Publication Data
US 2014/0252905 A1    Sep. 11, 2014

(30) Foreign Application Priority Data
Nov. 10, 2011 (FR) .................. 11 60283

(51) Int. Cl.
*H02K 19/12* (2006.01)
*H02K 19/26* (2006.01)
*H02K 1/16* (2006.01)

(52) U.S. Cl.
CPC ............ *H02K 19/12* (2013.01); *H02K 1/165* (2013.01); *H02K 19/26* (2013.01); *H02K 2213/03* (2013.01)

(58) Field of Classification Search
CPC ........ H02K 19/12; H02K 19/26; H02K 1/165; H02K 2213/03
USPC .................................. 310/162, 198
See application file for complete search history.

(56) References Cited

U.S. PATENT DOCUMENTS

| 2,385,101 | A | * | 9/1945 | Norman | ................ | G01P 1/006 |
| | | | | | | 310/187 |
| 2,385,670 | A | * | 9/1945 | Whiting | ................ | H02K 23/02 |
| | | | | | | 310/149 |
| 3,868,564 | A | * | 2/1975 | Arutjunian | ............ | H02K 19/26 |
| | | | | | | 310/198 |

(Continued)

FOREIGN PATENT DOCUMENTS

| CN | 201536282 U | 7/2010 |
| EP | 0 909 010 A1 | 4/1999 |
| FR | 2 898 439 A1 | 9/2007 |

OTHER PUBLICATIONS

Chen et al., "Low Cost Flux-Switching Brushless AC Machines," *Vehicle Power and Propulsion Conference (VPPC)*, 2010, IEEE.

(Continued)

*Primary Examiner* — Alex W Mok
(74) *Attorney, Agent, or Firm* — Oliff PLC

(57) ABSTRACT

A singly-excited flux-switching electrical machine, that includes field coils and phase windings, is provided. The field coils and the phase windings are accommodated respectively in the unevenly shaped notches of a stator, such that the field coils and phase windings are radially offset.

18 Claims, 3 Drawing Sheets

(56) References Cited

U.S. PATENT DOCUMENTS

| | | | | |
|---|---|---|---|---|
| 4,107,558 | A * | 8/1978 | Brown | H02K 41/025 310/13 |
| 6,051,904 | A | 4/2000 | Akemakou | |
| 6,242,834 | B1 | 6/2001 | Akemakou | |
| 2003/0015931 | A1 * | 1/2003 | Nishimura | H02K 16/04 310/184 |
| 2006/0220489 | A1 * | 10/2006 | Osawa | H02K 23/28 310/198 |
| 2008/0079375 | A1 * | 4/2008 | Seguchi | H02K 21/042 318/139 |
| 2008/0088196 | A1 * | 4/2008 | Takahashi | H02K 3/28 310/198 |
| 2008/0185933 | A1 * | 8/2008 | Baba | H02K 3/18 310/198 |
| 2009/0058213 | A1 * | 3/2009 | Sugishima | H02K 23/36 310/198 |
| 2010/0123426 | A1 * | 5/2010 | Nashiki | H02K 1/12 318/701 |
| 2011/0018381 | A1 * | 1/2011 | Miyata | H02K 3/28 310/207 |
| 2011/0148241 | A1 * | 6/2011 | Miyata | H02K 3/28 310/195 |
| 2011/0193444 | A1 * | 8/2011 | Maruyama | H02K 3/522 310/215 |
| 2011/0198962 | A1 * | 8/2011 | Tang | H02K 3/28 310/198 |

OTHER PUBLICATIONS

Zulu et al., "A Wound-Field Three-Phase Flux-Switching Synchronous Motor with AII Excitation Sources on the Stator," *IEEE Transactions on Industry Applications*, 2009, vol. 46, No. 6, IEEE.

Pollock et al., "Low Cost, High Power Density, Flux Switching Machines and Drives for Power Tools," *Conference Record of the Industry Applications Conference, 38th IAS Annual Meeting*, 2003, vol. 3, IEEE.

Pollock et al., "Flux Switching Motors for Automotive Applications," *Conference Record of the Industry Applications Conference, 38th IAS Annual Meeting*, 2003, vol. 1, IEEE.

Sulaiman et al., "A New Structure of 12Slot—10Pole Field-Excitation Flux Switching Synchronous Machine for Hybrid Electric Vehicles," *Proceedings of the 2011—14th European Conference on Power Electronics and Applications (EPE 2011)*, 2011, pp. 1-10, Birmingham, IEEE.

International Search Report issued in International Application No. PCT/IB2012/056253 dated Jun. 27, 2013 (with translation).

Written Opinion of the International Searching Authority issued in International Application No. PCT/IB2012/056253 dated Jun. 27, 2013 (with translation).

* cited by examiner

FLUX-SWITCHING ELECTRICAL MACHINE

The present invention relates to flux-switching machines and more specifically, but not exclusively, to those referred to as single excitation machines.

A flux-switching machine comprises a non-wound rotor devoid of permanent magnets and a stator comprising phase windings and excitation windings and/or permanent magnets. The AC voltage at the terminals of the phase windings is produced by the switching of the flux following the rotation of the rotor.

In conventional single excitation machines the stator is formed of a sequence of teeth and grooves, in which an excitation coil and a phase coil are arranged successively.

Figure 1:
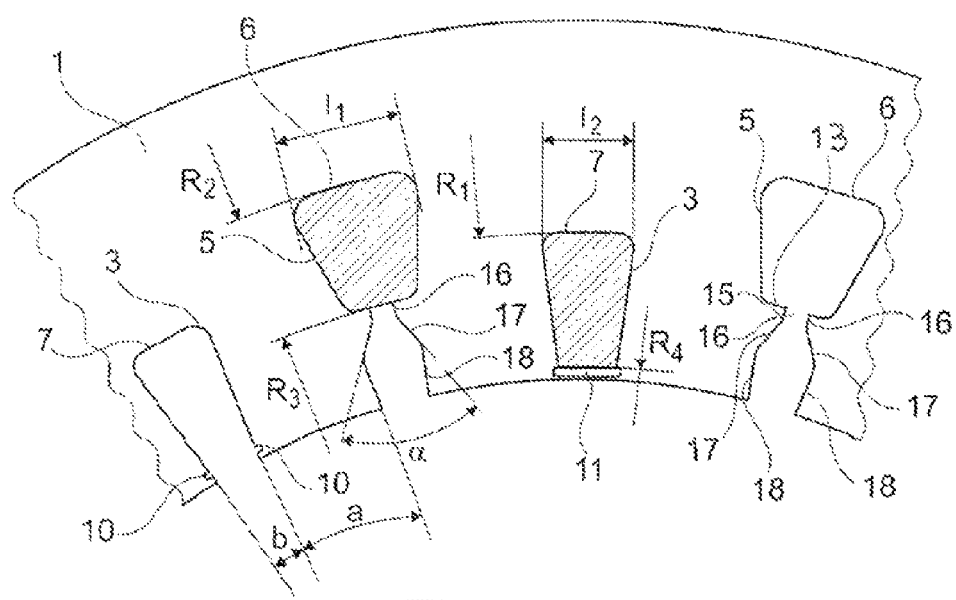

U.S. Pat. No. 6,242,834 discloses, in FIG. 6, an example of such a machine. FIG. 1 shows a double excitation machine, with grooves housing permanent magnets and excitation windings on the stator.

The following publications "Low Cost Flux—Switching Brushless AC Machines" 978-1-4244-8218-4/10©Crown, "A wound-Field Three-Phase Flux Switching Synchronous Motor with All Excitation Sources on the Stator" 978-1-4244-2893-9/09© 2009 IEEE pages 1502 to 1509, "tow Cost, High Power Density, Flux Switching Machines and Drives for Power Tools", 0-7803-7883-0/03© 2003 IEEE, "Flux Switching Motors for Automotive Applications" 07803-7883-0/03© 2003 IEEE, "A new structure of 12 Slot 10 Pole Field Excitation flux Switching Synchronous machine for Hybrid Electric Vehicles" EPE 2011 Birmingham, ISBN 9789075815153 pages 1 to 10, describe further examples of flux-switching machines.

Utility model CN 201536282 and patent EP0909010 disclose a double excitation flux-switching machine, in which the permanent magnets influence the excitation of the motor.

Publication FR 2 898 439 discloses a double excitation flux-switching machine. The grooves in the stator are of unequal shape so as to allow excitation windings and phase windings to be housed simultaneously in the deeper grooves.

In a known flux-switching machine, each groove receiving conductors of an excitation winding and the two adjacent grooves receiving conductors of phase windings constitute a basic cell. The excitation coils and the phase coils each cover two teeth pitches on the stator, that is to say the grooves which receive said windings are separated by two teeth.

These machines are generally characterized by the use of a significant quantity of copper or other conductor material in order to form the excitation windings so as to limit the losses sustained due to the Joule effect and the effects thereof on the output.

The object or the invention is to perfect these machines further.

In accordance with a first of its aspects, the invention relates to an electrical machine, advantageously a single excitation flux-switching machine, comprising excitation windings and phase windings, the excitation windings and the phase windings being housed in respective grooves in the stator, said grooves being of unequal shape and formed such that the excitation phases are offset radially with respect to the phase windings.

The excitation windings are advantageously closer to the air gap than the phase windings.

Thanks to the invention, the mechanical interferences between the excitation coils and the phase coils are reduced, and the radial offset makes it possible to minimize the length and bulk of the coil heads.

The invention also makes it possible to reduce very significantly the quantity of conductor materials used and to improve performance, in particular in terms of power and output.

In particular, the invention makes it possible, due to the positioning of the excitation windings, to reduce the excitation leakage flux and to raise the coupling of the rotor and stator armatures, which helps to increase the available electromagnetic torque.

If a and b are the angular widths respectively of a tooth and of a groove at the air gap, the ratio a/b may be between 0.65 and 0.85, better still between 0.7 and 0.8.

The phase windings and the excitation windings preferably overlap radially, that is to say they extend at least in part opposite one another in the radial direction, which makes it possible to increase compactness.

Each groove advantageously receives only one type of winding, that is to say a phase or excitation winding. A given groove thus does not comprise electrical conductors of phase windings and excitation windings simultaneously.

The grooves housing the windings distanced radially further from the rotor may have a greater circumferential dimension larger than the greatest circumferential dimension of the grooves housing the windings distanced less far radially from the rotor. This makes it possible to provide a greater sheet width for the excitation flux.

In an embodiment, the windings housed in the grooves distanced radially further from the rotor occupy a section $S_1$ in the grooves, and the windings housed in the grooves distanced less far radially from the rotor occupy a section $S_2$ in the grooves, where $S_2 \geq S_1$.

The base of the grooves distanced further radially from the axis of rotation of the rotor are arranged at a distance $R_2$, and the base of the grooves arranged less far from the axis of rotation are arranged at a distance $R_1$ therefrom, wherein possibly $0.8 \leq R_1/R_2 \leq 1.0$.

This, for example, facilitates a configuration in which the phase windings are housed in the corresponding grooves, arranged in two superimposed layers, the conductors associated, with each layer occupying the same regions of the two layers and/or the conductors of the excitation windings are arranged in the corresponding grooves in two nested layers, the conductors of one layer being arranged in different regions of the layers.

Such an arrangement is advantageous in that it minimizes the mechanical stresses on the coil heads during production thereof.

In a variant, the phase windings are housed in the corresponding grooves by being arranged without superimposing one another radially in these grooves, and the excitation windings are housed in the corresponding grooves by being arranged without superimposing one another radially in those grooves.

The grooves distanced further radially from the axis of rotation of the rotor may have, between the winding received by the groove and the air gap, opposed edges that are divergent then convergent in the direction of the rotor. The angle of divergence is between 50 and 60° for example. The divergent edges may be connected at their radially outer end to the convergent edges. These convergent edges may be connected to a shoulder, which helps to retain the conductors of the winding in the groove.

The grooves housing the windings distanced less far radially from the rotor may comprise reliefs for fixing chocks tot retaining the windings.

The machine may comprise a single phase winding per groove or, in a variant, two phase windings per groove.

In an embodiment, there is a number of stator teeth $n_{ds}$ equal to 24 and a number of rotor teeth $n_{dr}$ equal to 14.

Figure 2:
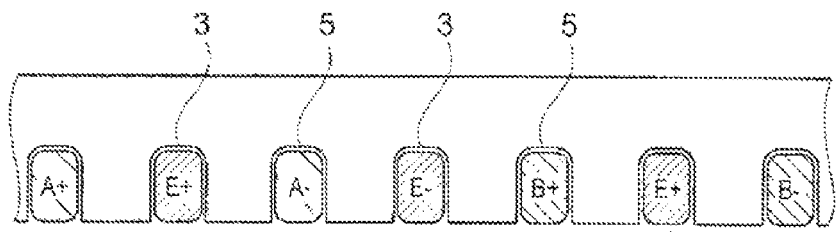
Figure 3:
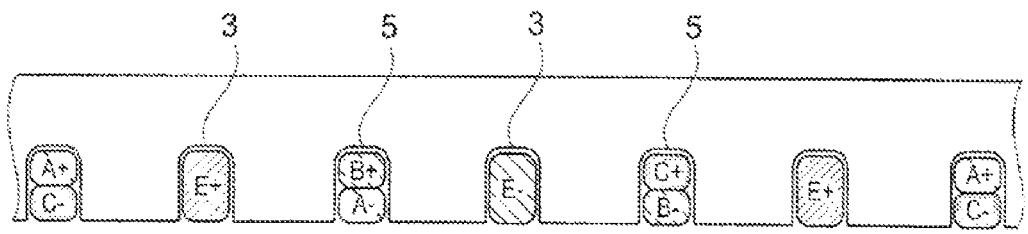
Figure 4:
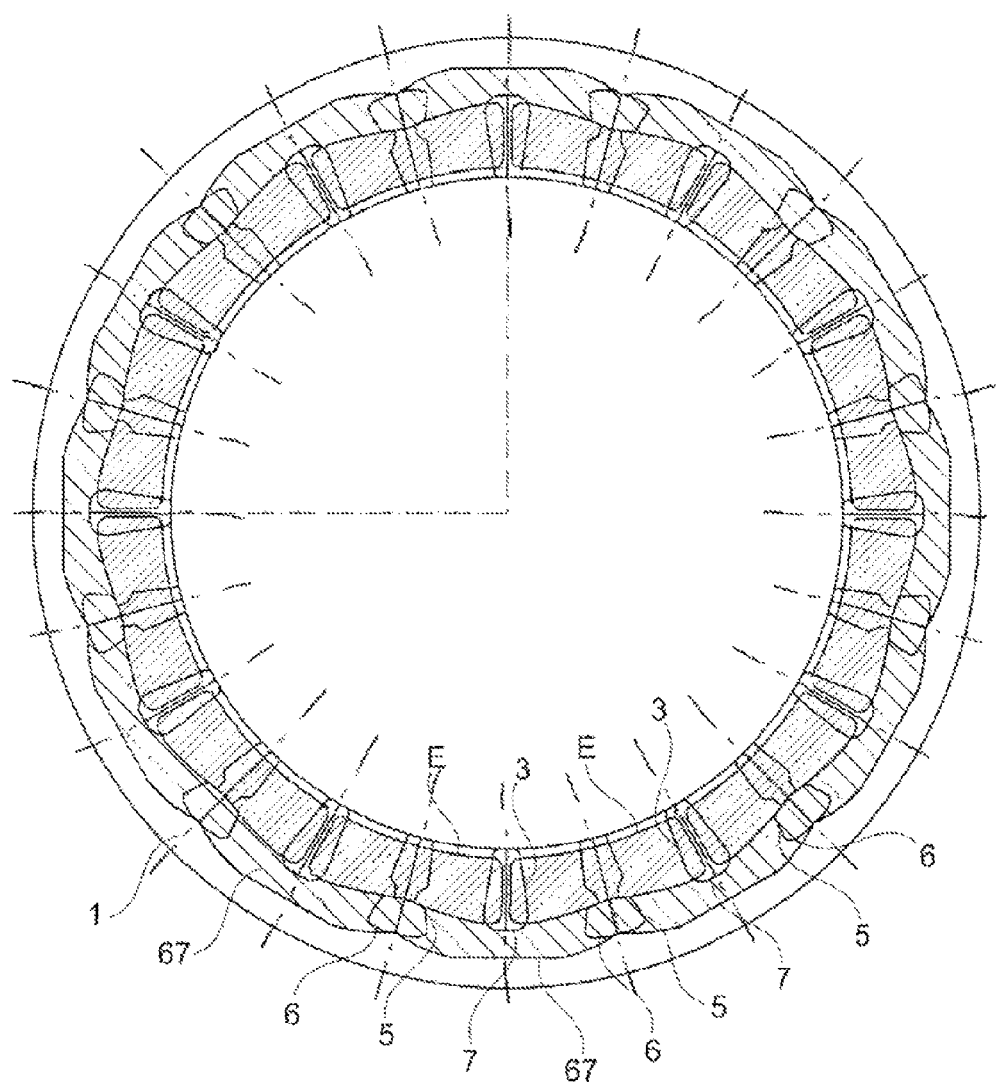
Figure 5:
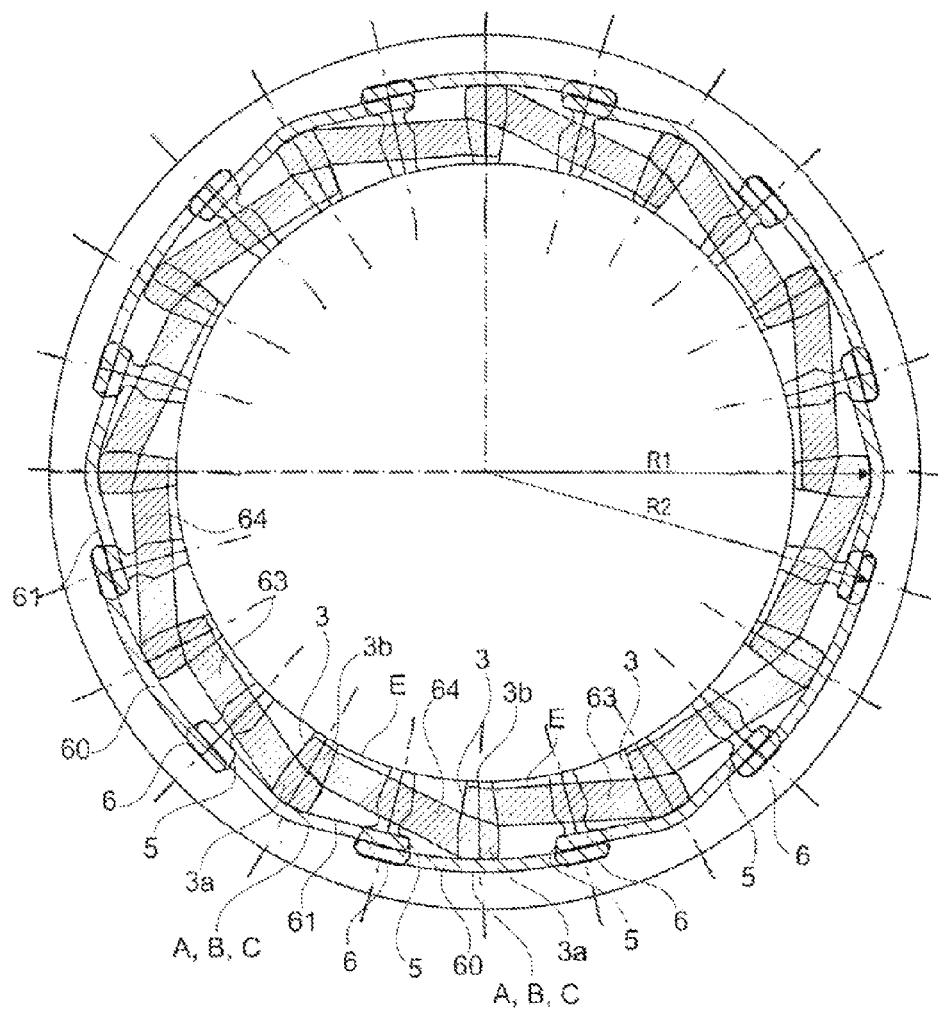

The invention will be better understood upon reading the detailed description hereinafter of non-limiting embodiments of the invention and upon examining the accompanying drawing, in which:

FIG. 1 shows part of an example of a stator formed in accordance with the invention, FIGS. 2 and 3 illustrate two possibilities for arranging windings of the stator in the grooves, and FIGS. 4 and 5 show two exemplary embodiments of a stator winding.

FIG. 1 schematically shows a stator 1 of a single flux-switching machine, said stator being designed to cooperate magnetically with a rotor which is devoid of permanent magnets and comprises, for example, $n_{dr}$ teeth arranged equidistantly on the periphery of the rotor.

The stator 1 comprises two sets of grooves, that is to say a first set of grooves 3 receiving the excitation windings E and a second set of grooves 5 receiving the phase windings A, B and C in the case of a three-phase machine.

In accordance with the invention, the grooves 3 and 5 are offset radially, the base 6 of the grooves 5 being arranged at a greater distance from the axis of rotation than the base 7 of the grooves 3.

In FIG. 1 some grooves 3 or 5 have been shown without the windings so as to show the contour more clearly.

As illustrated, the grooves 3 may comprise, close to the air gap, reliefs 10 in the form of small necks for receiving chocks 11 for retaining the windings, said chocks being mounted slidingly in the necks 10 (not illustrated).

The grooves 5 have a shoulder 13, which can serve to rest against the conductors housed inside. The shoulder 13 borders a passage 15 formed between the convergent edges 16, which are connected in the direction of the air gap to edges 17 which diverge as they near the rotor and in turn are connected to edges 18 which converge as they near the rotor.

The edges 18 are preferably as radial as possible so as to produce a passage of excitation flux of substantially constant density in the direction of the air gap.

If a and b denote the respective angular widths of a tooth and a groove at the air gap, then the following is preferably true: $a/b \sim 0.75$.

The angular width b of the grooves 3 at the air gap is preferably equal to that of the grooves 5.

In the drawing, $R_2$ denotes the distance from the base 6 of the groove 5 to the axis of rotation of the rotor, $R_1$ denotes the distance from the base 7 of the groove 3 to the same ads, and $R_3$ denotes the distance from the winding received in the groove 5 to the axis of rotation, that is to say the distance from the shoulder 13 to this axis. The coils received in the grooves 3 are arranged at a distance $R_4$ from the axis of rotation. Preferably, $0.8 \leq R_1/R_2 \leq 1.0$, which facilitates the mounting of the windings in accordance with a nested configuration, as described further below with reference to FIG. 5.

In addition, the angle α of divergence of the edges 17 is between 50 and 60°, for example.

As can be seen in FIG. 1, the grooves 5 which are further from the axis of rotation than the grooves 3 may have at greater circumferential dimension $l_1$ larger than the greatest circumferential dimension $l_2$ of the grooves 3.

The machine comprises a sequence of basic cells each formed by at groove containing the conductors or E+ or E− of an excitation winding E and by two adjacent grooves receiving the conductors of the phase coils A+, A−, B+, B−, C+ or C−, the machine being multi-phased, in particular three-phased, A, B and C denoting the phases.

By convention, the signs + and − are attributed to the conductors depending on whether they have one direction or another within the groove. The same excitation coil thus comprises conductors E+ and E−.

The excitation windings E are connected conventionally to a direct current source.

The axis of each coil is oriented substantially radially, the machine being what is known as a "radial" machine.

FIGS. 2 and 3 illustrate exemplary configurations for filling the grooves. In this figure, the suitor is represented linearly with equal grooves 3 and 5 for clarity and simplification of the drawing.

The grooves which receive the phase windings may each receive a single phase winding, as illustrated in FIG. 2, for example with, as illustrated, an alternation in the circumferential direction between the conductors E+ et E− of the excitation windings and those of the phase windings, for example with, as illustrated, the sequence of phase conductor A+, excitation conductor E+, phase conductor A−, excitation conductor E−, phase conductor excitation conductor phase conductor B−.

In a variant, as illustrated in FIG. 3, the winding is said to be double-layered, that is to say a groove receiving, the phase windings receives the windings of two phases, for example A+ and C−, B+ and A−, C+ and B−, A+ and C−, as illustrated.

The phase windings A, B or C can each be arranged, as illustrated in FIG. 4, in a layer 67, the electric conductors of the same phase winding, occupying groove portions arranged at the same distance from the axis of rotation. Two phase windings having conductors received in the same groove 5 are not superimposed radially. The same may be true of the excitation windings E. It can be seen in FIG. 4 that the coil heads are not nested.

In FIG. 5 a configuration in which the phase windings A, B or C are arranged in two layers 60, 61 in a manner radially superimposed in the grooves 3 is shown. The electric conductors in the same layer 60 or 61 occupy groove portions arranged at the same distance from the axis of rotation.

The excitation windings E are arranged in two nested layers 63, 64, that is to say the conductors in the same layer 63 or 64 are arranged in portions 3a, 3b of two consecutive grooves 3, arranged at different distances from the axis of rotation. Thus, the same excitation winding comprises, on the one hand, conductors arranged in the portion 3b of the groove 3 closest to the air gap, and, on the other hand, in the adjacent groove 3, conductors arranged in the portion 3a of the groove furthest from the air gap.

The invention is not limited to these specific configurations of grooves and windings, and, for example, basic cells may be provided of which the grooves receiving the excitation conductors E+ and E− respectively of the same excitation coil are separated by a different number of teeth.

The expression "comprising a" is to be understood as a synonym of "comprising at least one".

The invention claimed is:

1. A single excitation flux-switching electrical machine, comprising excitation windings and phase windings, the excitation windings and the phase windings being housed in respective grooves in a stator, of unequal shape, such that the excitation windings and the phase windings are offset radially.

2. The machine as claimed in claim 1, wherein the excitation windings are closer to an air gap than the phase windings.

3. The machine as claimed in claim 1, wherein $0.65 \leq a/b \leq 0.85$, where a is the angular width of a tooth at the air gap and b is the angular width of a groove at the air gap.

4. The machine as claimed in claim 3, wherein $0.7 \leq a/b \leq 0.8$.

5. The machine as claimed in claim 1, the phase windings and the excitation windings overlapping one another radially.

6. The machine as claimed in claim 1, the grooves housing the windings radially further from a rotor having a greater circumferential dimension larger than the greatest circumferential dimension of the grooves housing the windings distanced less far radially from the rotor.

7. The machine as claimed in claim 1, the windings housed in the grooves radially further from the rotor occupying a section S1 and the windings housed in the grooves distanced less far radially from the rotor occupying a section S2, where $S2 \geq S1$.

8. The machine as claimed in claim 1, the base of the grooves radially further from the axis of rotation of the rotor being arranged at a distance R2 and the base of the grooves arranged less far from the axis of rotation being arranged at a distance R1 therefrom, where $0.8 \leq R1/R2 \leq 1.0$.

9. The machine as claimed in claim 1, the grooves radially further from the axis of rotation of the rotor having, between the winding received by the groove and the air gap, opposed edges diverging in the direction of the rotor, then opposed edges converging in the direction of the rotor.

10. The machine as claimed in claim 9, the angle of divergence being between 50 and 60°.

11. The machine as claimed in claim 9, the divergent edges being connected at their radially outermost end to convergent edge.

12. The machine as claimed in claim 11, the convergent edges being connected to a shoulder.

13. The machine as claimed in claim 1, the grooves housing the windings distanced less far radially from the rotor comprising reliefs for fixing chocks for retaining the windings.

14. The machine as claimed in claim 1, comprising a single phase winding per groove.

15. The machine as claimed in claim 1, comprising two phase windings per groove.

16. The machine as claimed in claim 1, with a number of stator teeth $n_{ds}$ equal to 24 and a number of rotor teeth $n_{dr}$ equal to 14.

17. The machine as claimed in claim 1, the phase windings housed in the grooves being arranged in two superimposed layers, the conductors associated with each layer occupying the same regions of the two layers, the conductors of the excitation windings arranged in the grooves being arranged in two nested layers, the conductors of the same winding being arranged in different regions of the grooves.

18. The machine as claimed in claim 1, the phase windings housed in the grooves being arranged without superimposing one another radially in these grooves, and the excitation windings housed in the grooves being disposed without superimposing one another radially in these grooves.

* * * * *